United States Patent [19]

Ball et al.

[11] Patent Number: 4,964,431
[45] Date of Patent: Oct. 23, 1990

[54] BUTTERFLY VALVE APPARATUS AND METHOD

[75] Inventors: Larry K. Ball, Chandler; Marshall U. Hines, Scottsdale; Terry L. Miller, Mesa, all of Ariz.

[73] Assignee: Allied-Signal Inc., Morris Township, Morris County, N.J.

[21] Appl. No.: 422,210

[22] Filed: Oct. 16, 1989

[51] Int. Cl.$^5$ .............................................. F16K 1/22
[52] U.S. Cl. ...................................... 137/1; 251/283; 251/287; 251/305
[58] Field of Search ....................... 137/1, 516; 251/25, 251/281, 283, 287, 305

[56] References Cited

U.S. PATENT DOCUMENTS

| | | |
|---|---|---|
| 212,556 | 2/1879 | Johnson . |
| 443,326 | 12/1890 | Leverich . |
| 932,172 | 8/1909 | Porter et al. . |
| 965,322 | 7/1910 | Peterson . |
| 1,167,145 | 1/1916 | Baverey . |
| 1,328,565 | 1/1920 | Howard . |
| 1,541,047 | 6/1925 | Hart . |
| 1,744,798 | 1/1930 | Price . |
| 2,051,881 | 8/1936 | Mock . |
| 2,095,263 | 4/1936 | Moss . |
| 2,271,390 | 1/1942 | Dodson . |
| 2,796,082 | 6/1957 | Green .................. 251/25 X |
| 2,833,511 | 5/1958 | Fletcher . |
| 2,910,266 | 10/1959 | Condello et al. . |
| 3,008,685 | 11/1961 | Rudden . |
| 3,062,232 | 11/1962 | McGay . |
| 3,065,950 | 11/1962 | Goldburg . |
| 3,200,838 | 8/1965 | Sheaffer . |
| 3,298,659 | 1/1967 | Dupedo . |
| 3,344,808 | 10/1967 | Cary . |
| 3,400,907 | 9/1968 | Horn et al. . |
| 3,442,489 | 5/1969 | Cary et al. . |
| 3,516,640 | 6/1970 | Bryer et al. . |
| 3,545,486 | 12/1970 | Larson . |
| 3,675,681 | 7/1972 | Obermaler . |
| 3,677,297 | 7/1972 | Walton . |
| 3,794,288 | 2/1974 | Dolder et al. . |
| 3,960,177 | 6/1976 | Baumann . |
| 3,971,414 | 7/1976 | Illing .................. 251/305 X |
| 3,982,725 | 9/1976 | Clark . |
| 3,993,096 | 11/1976 | Wilson . |
| 4,084,617 | 4/1978 | Happe . |
| 4,190,074 | 2/1980 | Mailliet et al. . |
| 4,313,592 | 2/1982 | Baas . |
| 4,367,861 | 1/1983 | Bray et al. . |
| 4,508,132 | 4/1985 | Mayfield, Jr. et al. . |
| 4,534,538 | 8/1985 | Buckley et al. . |
| 4,556,192 | 12/1985 | Ramisch . |
| 4,586,693 | 5/1986 | Tinner . |
| 4,706,706 | 11/1987 | Page et al. . |
| 4,712,768 | 12/1987 | Herr et al. . |

FOREIGN PATENT DOCUMENTS 2821766 11/1979 Fed. Rep. of Germany .
1533073 11/1978 United Kingdom .

OTHER PUBLICATIONS

"Fishtail vs. Conventional Discs in Butterfly Valves", Carl Wilson, Instruments & Control Systems, vol. 41; Mar. 1968.

"The Note on the Reduction of the Fluid Dynamic Torque of Butterfly Valves", D. W. Bryer, National Physical Laboratory, Aerodynamics Division, Sep. 1986.

Primary Examiner—Robert G. Nilson
Attorney, Agent, or Firm—Terry L. Miller; Joseph R. Black; James W. McFarland

[57] ABSTRACT

A butterfly valve includes a duct defining a fluid flow path and a plate-like valve member pivotal in the duct to in one position open and close the latter. The valve member is pivotal to a second position spanning the duct and extending parallel to the flow path to allow fluid flow therein. Means are provided for altering the effective area distribution of the valve member about its pivot axis in order to effect pivotal movement of the valve member in response to fluid dynamic flow forces. An actuator carried upon the valve member cooperates with the duct to forcefully effect initial opening and final closing movements of the valve member.

34 Claims, 3 Drawing Sheets

FIG. 3
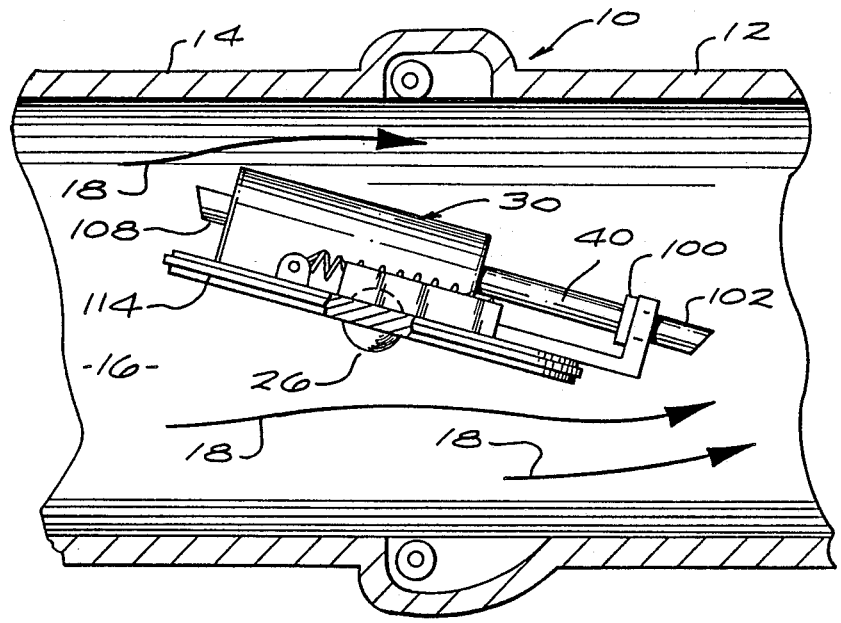
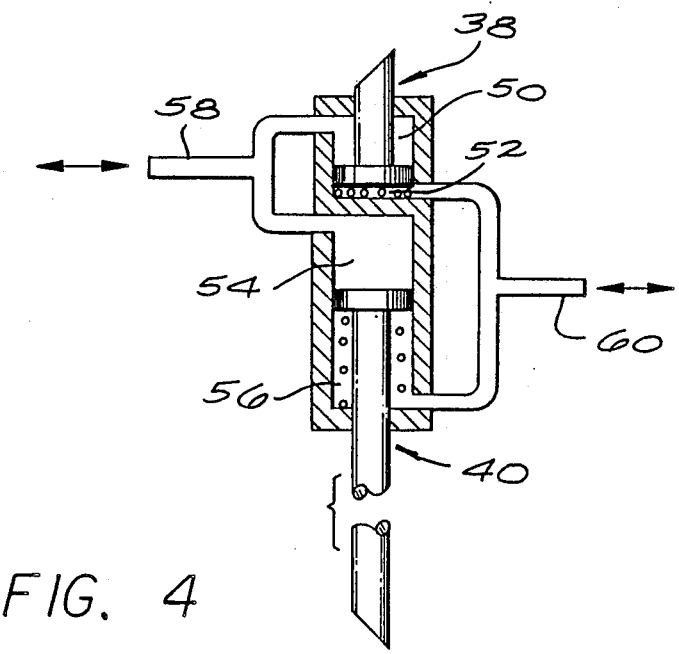
FIG. 4

BUTTERFLY VALVE APPARATUS AND METHOD

The coinventors named on this application are also coinventors on other related applications generally relating to butterfly valves (including Ser. Nos. 374,897, filed June 30, 1989; 395,234, filed Aug. 17, 1989; 422,354, filed Oct. 16, 1989; 422,380, field Oct. 16, 1989; 422,487, filed Oct. 16, 1989; 426,921, filed Oct. 24, 1989; and 451,659, filed Dec. 15, 1989), all cofiled or copending with the present application, and all assigned to Allied-Signal Inc.

The present invention relates generally to valve apparatus and methods. More particularly, the present invention relates to butterfly valve apparatus and methods wherein a duct defines a flow path for conveying a flow of fluid. A plate-like valve member is pivotally disposed in the duct about a transverse axis, and is conformal at its outer periphery to the internal wall shape of the duct. The valve member is pivotal between a first position transverse to the flow path and substantially sealingly engaging the duct wall to close fluid flow therein, and a second position spanning the flow path generally parallel therewith to allow and control the fluid flow therein.

A conventional butterfly valve is set forth, by U.S. Pat. No. 3,971,414, issued July 27, 1976 to H. Illing. The '414 patent also discusses the general state of the butterfly valve art prior to the invention by Illing. According to the teaching of the '414 patent, the actuating torque required to rotate the valve member of a butterfly valve from its closed position to an open position may be reduced by utilizing an articulated valve member. That is, the plate like butterfly valve member includes a leading wing and a trailing wing with respect to fluid flow. The leading wing of Illing's valve member is defined in part by a servo or spoiler tab which is carried by and pivotally movable relative to the remainder of the valve member. By pivoting the spoiler tab ahead of the valve member in the opening direction so as to point into the fluid flow Illing changes the angulation and effective moment arm of the fluid pressure and flow forces on the spoiler tab. Illing hopes to reduce the total torque opposing opening of the valve member in comparison to previoulsy known butterfly valves. The articulation of the spoiler tab is such that it pivots from an aligned position to move ahead of the valve member during most of the pivotal movement of the latter in the opening direction. During the last portion of the pivotal movement of the valve member to its fully open position, the servo tab reverses its relative pivotal movement and returns to an aligned position achieved when the valve member is fully open. In this way, the valve member and servo tab align with one another and with the fluid flow in the fully open position of the valve member.

A reduction in the operating torque required to move the valve member from its closed to its open position, such as assertedly achieved by the invention of Illing, has been a long-recognized need in the field of butterfly valves. Unfortunately, the invention of Illing as set forth in the '414 patent does not fully comprehend the usual design: requirements for a butterfly valve, and has not enjoyed commercial acceptance, to the Applicant's knowledge.

It will be understood by those skilled in the pertinent art that the valve member of a coinventional butterfly valve must ordinarily achieve a sealing tight fit with the walls of the duct. Ordinarily the plate-like butterfly valve member carries a seal member at the outer periphery thereof. This seal member, for example, a piston ring type, o-ring, or lip seal, is resiliently and sealingly engageable with the duct wall in the closed position of the valve member. Thus, it is conventional for the plate-like valve member to be circumferentially continuous, and to be skewed slightly relative to the pivot shaft supporting the valve member. That is, the periphery of the valve member is disposed upstream of the shaft on one side and downstream of the shaft or the other to allow use of a circumferentially continuous sealing member at the periphery of the valve member. The pivot shaft may transect the duct perpendicularly to the flow path, or be angulated relative to the latter. The valve taught by the '414 patent does not permit use of a circumferentially continuous sealing member on the valve member periphery.

In view of the deficiencies of the known butterfly valve art it is an object for this invention to reduce or eliminate the opposing torque which must be overcome to move the valve member of a butterfly valve from its closed to its open position.

Desirably, fluid pressure and flow forces acting on the plate-like butterfly valve member may be used to reduce or eliminate the opposing torque, or to effect pivotal movement of the valve member.

Still further, in view of the deficiencies of the valve taught by Illing in the '414 patent, a circumferentially continuous sealing member must be possible of use on the valve member.

Accordingly the present invention provides a duct defining a flow path therein, a plate-like butterfly valve member freely pivotal in said flow path about a pivot axis between a first position transverse to and closing said flow path and a second position generally parallel to said flow path to open and allow flow of fluid therein, said butterfly valve member including a pair of wing portions of substantially equal effective areas on opposite sides of said pivot axis, one of said pair of wing portions being a downstream wing with respect to pivotal movement of said butterfly valve member and flow in said flow path, and means for increasing the effective area of said downstream wing.

An advantage of the present invention is that it allows use of a circumferentially continuous sealing member on the plate-like valve member of the butterfly valve.

Another advantage of the present invention is the complete elimination of an externally mounted actuator. That is, a conventional valve actuator possibly mounted to the duct and providing torque to the plate-like valve member relative to the duct is not required with the present invention.

BRIEF DESCRIPTION OF THE DRAWINGS

FIG. 3 schematically depicts a fluid flow circuit of the invention: and

FIG. 4 provides a schematic longitudinal and partially cross-sectional view similar to FIG. 1, but with parts shown in alternative operative positions.

FIGS. 1 and 2 in conjunction schematically depict a butterfly valve or valve device 10 having a duct 12 with an elongate circumferentially extending wall 14. The wall 14 bounds a flow path 16 wherein fluid may flow, as depicted by arrow 18. In order to control the flow of fluid in flow path 16, a plate-like valve member 20 is freely pivotally disposed in the duct 12. The duct 12 defines a pair of transversely aligned inwardly opening sockets 22, 24, while the valve member 20 includes a pair of trunnions 26, 28 sealingly and freely rotatably received in the sockets 22, 24. Also carried upon the plate-like valve member 20 is a dual-function actuator, generally referenced with the numeral 30.

Figure 2:
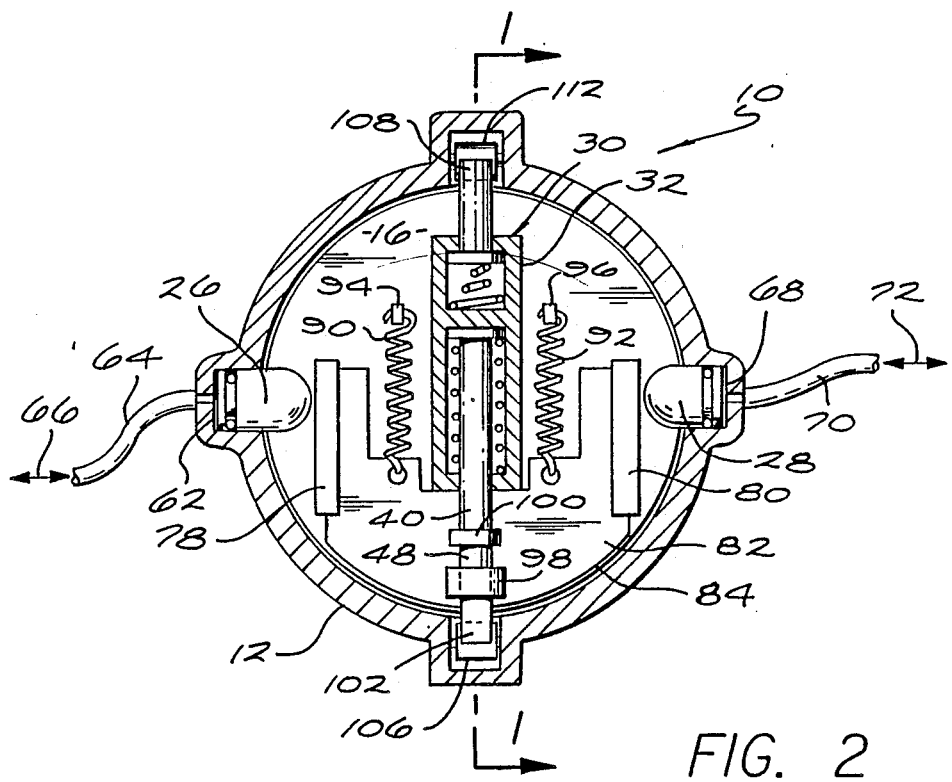
FIG. 2 is a partially cross-sectional view taken generally along line 2—2 of FIG. 2.
Figure 2A:
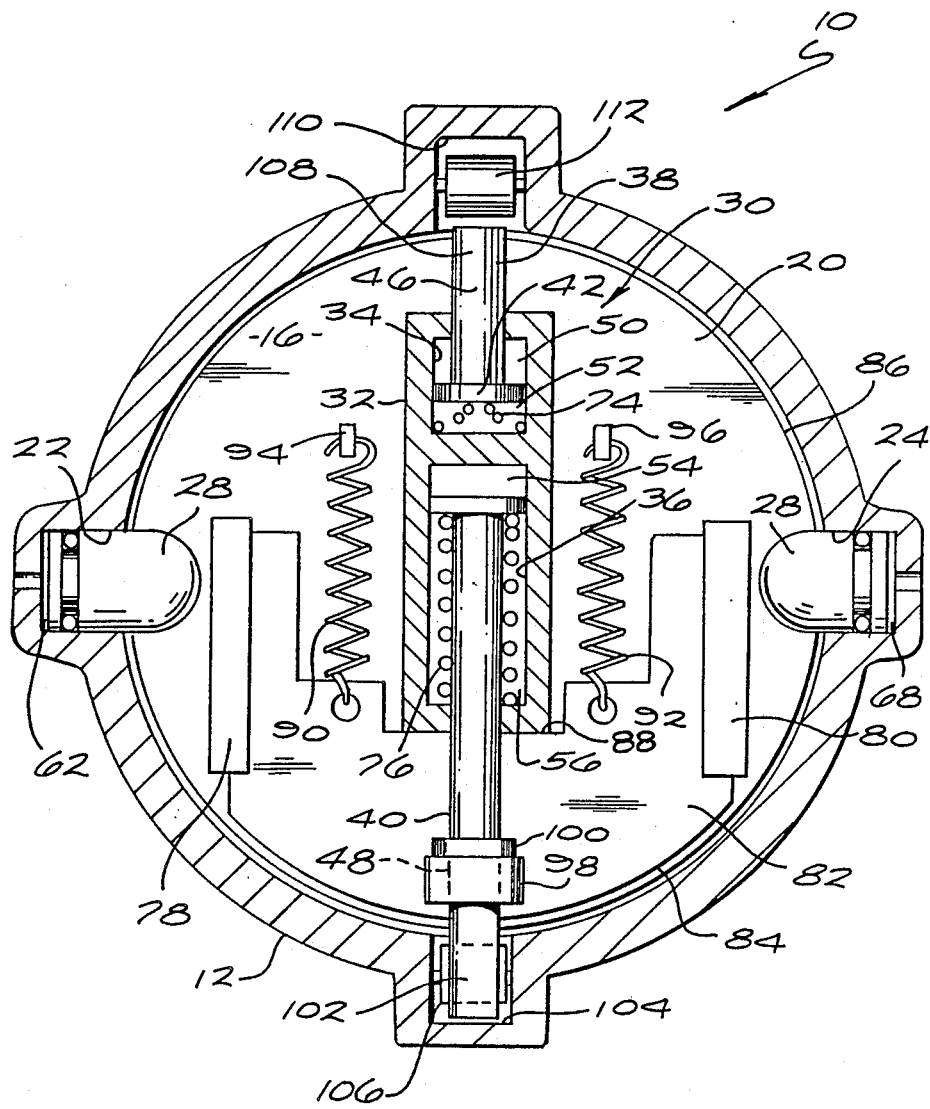
FIG. 2A provides an enlarged fragmentary view similar to FIG. 2, but providing a view of a dual-function actuator with parts thereof slightly shifted from their position of FIG. 2 to better illustrate structural features thereof. This actuator is also depicted on a smaller scale in FIG. 2.

Viewing FIGS. 2 and 2A, in particular, it is seen that the actuator 30 includes a housing 32 defining therein two oppositely extending bores 34, 36 opening at opposite ends of the housing. Sealingly and reciprocably received respectively in the bores 34, 36 are respective ones of a pair of piston members 38, 40. The piston members 38, 40 each include a respective piston head portion 42, 44, and a respective piston rod portion 46, 48. The piston members 38, 40 respectively divide bores 34, 36 into pairs of chambers 50, 52, and 54, 56, which expand and contract in opposition in response to reciprocation of the respective piston member.

FIGS. 2 and 4 in conjunction show schematically a pair of bifurcated fluid flow passages 58, 60 defined by the valve member 20 and housing 32. Fluid flow passage 58 communicates chambers 50 and 54 of actuator 30 with a chamber 62 defined within socket 22, and from there to a conduit 64 for receipt and relief of pressure fluid, as depicted by arrow 66. Similarly, passage 60 communicates chambers 52 and 56 with a chamber 68 defined within socket 24, and to a conduit 70 for receipt and relief of pressure fluid, as represented by arrow 72. Returning to consideration of FIGS. 2 and 2A, it will be seen that a coil spring 74 is disposed in chamber 52 to urge the piston member 38 to a first or extended position. Also, disposed within chamber 56 is a coil spring 76 urging piston member 40 to a first or retracted position.

FIG. 2 shows that the plate-like valve member 20 carries a pair of spaced apart guide members 78, 80. Slidably received in the embrace of guide members 78, 80, in sliding juxtaposition with a face of the valve member 20, is a plate-like partially arcuate flap member 82. The flap member 82 defines an arcuate edge 84 which in a first position of the flap member is disposed slightly inwardly of an outer peripheral surface 86 of the valve member 20. In the first position of the flap member 82, an abutment surface 88 thereof engages the housing 32 of actuator 30. A pair of coil tension springs 90, 92 at one end engage the flap member 82 and extend to respective lugs 94, 96 carried by valve member 20. The springs 90, 92 urge the flap member 82 to its first position, as depicted in FIG. 2, wherein the surface 88 abuts housing 32.

Also carried by the flap member 82 is an apertured boss 98 through which extends the rod portion 48 of piston member 40. Spaced from the boss 98, the piston rod 48 carries an abutment ring 100. Outwardly of the boss 98, the rod portion 48 includes a cam-surface or wedge-surface termination portion 102. The portion 102 of rod 48 is received in an axially extending recess 104 defined on the wall 14 of duct 12. Within the recess 104, a roller member 106 is rotationally disposed for engagement by the termination portion 102 of rod 48, viewing FIGS. 1 and 2 in particular.

Figure 1:
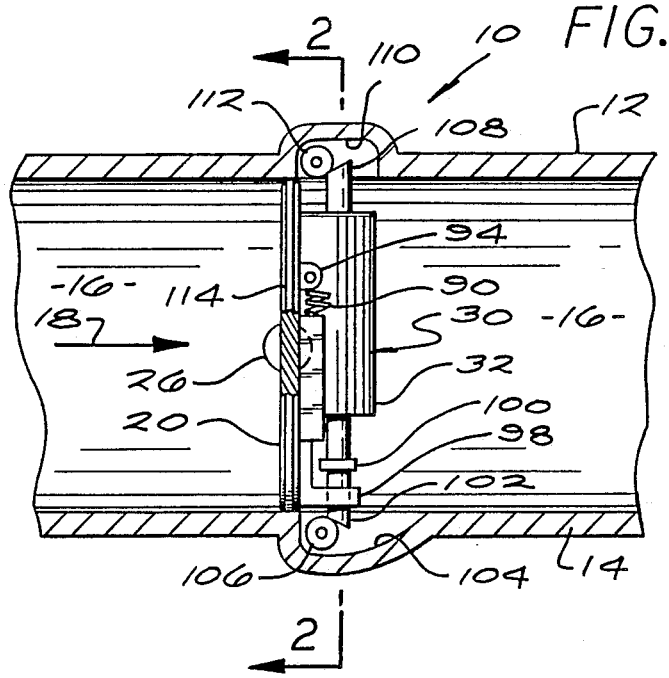
FIG. 1 provides a schematic longitudinal and partially cross-sectional view taken generally along line 1—1 of FIG. 2.

Similarly to the piston rod 48, the piston rod 46 includes a cam-surface or wedge-surface termination portion 108 which is disposed in a recess 110 on the wall 14 of duct 12. The wedge-surface portion 108 is disposed oppositely to portion 102, and is engageable with a roller striker member 112 rotatably disposed in the recess 110. It will be noted that each of the recesses 104, 110 is disposed downstream of the valve member 20 when the latter is in its first or closed position, as depicted in FIG. 1. Consequently, a sealing member 114 carried on valve member 20 at the outer peripheral surface 86 thereof may engage a circumferentially continuous portion of the wall 14 upstream of the recesses 104, 110.

Those skilled in the butterfly valve art will recognize that the plate-like valve member 20 may be skewed with respect to the pivot axis defined by the trunnious 26, 28. In other words the valve member may be disposed upstream of one trunnion and downstream of the other trunnion to allow peripheral surface 86, and perhaps also the sealing member 114, to be circumferentially continuous. However, this feature is omitted from the schematic depictions of the drawing Figures for ease of illustration. The sealing member 114 nay be a piston ring type, an o-ring, or a lip-seal type, for example. Regardless of the type of sealing member employed, the sealing member frictionally engages the wall 14 to effect a fluid seal therwith. As a result, an additional increment of torque is required to pivot the valve member 20 in its final movement to its closed position, and in its initial movement from the closed position toward opening of the flow path 16.

In operation of the butterfly valve 10, pressurized fluid 18 in the flow path 16 applies static fluid pressure forces to the wings 20', 20" of the valve member 20. The wings 20', 20" are of equal areas, and disposed on opposite sides of the pivot axis defined by trunnious 26, 28. Because these static fluid pressure forces are applied to equal areas on each side of the pivot axis of valve member 20, the latter is stable in its closed position depicted in FIG. 1.

In order to pivot the valve member 20 toward an open position thereof, pressurized fluid is provided to chambers 50 and 54 via passage 58, chamber 62, and conduit 64, as depicted by arrow 66, viewing FIGS. 2, 2A, and 3. The spring rate and preload of the springs 74 and 76 are selected so that the piston member 38 retracts fully to its position illustrated in FIGS. 3 and 4 before piston member 40 begins to extend. Consequently, the rod end portion 108 is first retracted to disengage from roller member 112. Subsequently, the piston member 40 begins to extend in opposition to spring 76. This extension of piston member 40 forces the cam-surface termination portion 102 against roller member 106 to effect a counter clockwise opening torque on the valve member 20. This opening torque is sufficient to overcome the frictional engagement of sealing member 114 with the wall 14, and to pivot the valve member 20 through an initial opening angular increment toward the position depicted in FIG. 4.

This initial opening movement of the butterfly valve member 20 is sufficient to "crack open" the valve 10 and allow the beginning of fluid flow in flow path 16.

Subsequent to this initial opening movement of valve member 20, further inflow of pressurized fluid to chamber 54 causes the piston member 40 to further extend contacting abutment ring 100 with boss 98. Additional pressurization of chamber 54 causes the piston member 40 to move flap member 82 outwardly in opposition to the springs 90, 92. During this phase of valve operation, the valve member 20 is subject not only to static fluid pressure forces, but also to dynamic fluid flow forces. Extension of the flap member 82 at its edge 84 outwardly beyond the peripheral surface 86 of the valve member 20 has the effect of enlarging the trailing wing 20" thereof, while the leading wing 20' remains of constant area. In other words, the silhouette of the valve member 20 is enlarged at the trailing wing 20" thereof. Thus, the valve member 20 may be considered to act somewhat like a weather vane turning toward or away from the oncoming fluid flow in response to the fluid dynamic forces effective thereon.

As depicted in FIG. 4, the flap member 82 is almost completely extended outwardly of the trailing wing 20" of valve member 20. Consequently, the freely-pivotal valve member 20 has taken an angular position in duct 12 allowing substantially full fluid flow therein. The applicants believe the angular position of valve member 20 correlates directly with the degree of extension of flap 82, and is relatively stable. That is, even though the valve member 20 is freely pivotal via trunnions 26, 28 in sockets 22, 24, there is little oscillation in the angular position of the valve member, and such fluxuation of flow in duct 12 as would result of such oscillation is not experienced.

In order to progressively close the valve member 20 from its position of FIG. 4 toward its position of FIG. 1, the pressure fluid is progressively relieved from chamber 54 via passage 58. Consequently, the flap member 82 is retracted progressively by springs 90, 92, and the valve member pivots toward its closed position in response to fluid dynamic flow forces. When the pressure fluid in chamber 54 is completely relieved, the valve member 20 will be close to, but not completely in, its position of FIG. 1. That is, the flap member 82 is completely retracted with abutment surface 88 engaging housing 32. The piston member 40 is completely retracted by spring 76, and spring 74 partially extends piston member 38 so that end 108 engages roller member 112. However, the spring 74 is the weakest of all the springs in the valve 10, and cannot extend piston member 38 because of the frictional engagement of sealing member 114 with wall 14.

Consequently, in order to completely close the valve member 20, pressurized fluid is provided to chambers 50 and 56 via the passage 60, chamber 68, and conduit 70, as depicted by arrow 72, viewing FIG. 2. This pressurized fluid expands chamber 52, and via end portion 108 in engagement with roller member 112, provides a clockwise closing torque to valve member 20. This closing torque is sufficient to overcome the frictional resistance provided by sealing member 114, and to move the valve member 20 to its fully closed position of FIG. 1. This fluid pressure supply to chamber 52 need not be maintained. A relatively short period of supply of pressure fluid to chamber 52 will sealingly close the valve member 20, after which it is stable in its closed position depicted in FIG. 1.

What is claimed is:

1. A butterfly valve comprising a duct defining a flow path therein, a plate-like butterfly valve member freely pivotal in said flow path about a pivot axis between a first position transverse to and closing said flow path and a second position generally parallel to said flow path to open and allow flow of fluid therein, said butterfly valve member including a pair of wing portions of substantially equal effective areas on opposite sides of said pivot axis, one of said pair of wing portions being a downstream wing with respect to pivotal movement of said butterfly valve member and flow in said flow path, and means for increasing the effective area of said valve member, wherein said means for increasing the effective area of said valve member includes a flap member movably carried by said downstream wing and selectively extensible therefrom into fluid flow therepast.

2. The invention of claim 1 wherein said flap member is slidably carried by said downstream wing.

3. The invention of claim 2 wherein said flap member is planar and is slidably movable along a movement path generally parallel with the plane of said plate-like butterfly valve member.

4. The invention of claim 3 wherein said planar flap member includes an outer edge, said flap member being slidably movable between a first position in juxtaposition with said butterfly valve member wherein said outer edge is disposed inwardly of a respective outer edge of said butterfly valve member, and said planar flap member sliding generally in the plane thereof to a second position wherein said outer edge thereof is disposed outwardly of said outer edge of said butterfly valve member, whereby the protruding area of said flap member between the outer edge thereof and the outer edge of said butterfly valve member adds to the effective area of said downstream wing.

5. The invention of claim 4 further including an actuator carried by said butterfly plate member and selectively moving said flap member between said first and said second positions.

6. The invention of claim 5 wherein said actuator is a linear fluid pressure motor.

7. The invention of claim 1 also including engagement means carried by said butterfly valve member for engaging a wall of said duct to prevent free pivotal movement of said butterfly valve member.

8. The invention of claim 7 wherein said engagement means includes means for forcefully pivoting said butterfly valve member through an angular increment between said first closed position and an initial open position.

9. The invention of claim 8 wherein said engagement means includes opening means for engaging said duct wall to forcefully pivot said butterfly valve member from said first closed position through said angular increment to said initial open position.

10. The invention of claim 9 wherein said opening means includes a cam or wedge member movably carried upon said butterfly valve member and engageable with said duct wall to forcefully move said valve member relative thereto.

11. The invention of claim 10 further including an opening actuator carried upon said butterfly valve member and selectively moving said cam or wedge member to effect said pivotal movement of said butterfly valve member.

12. The invention of claim 9 wherein said engagement means includes closing means for engaging said duct wall to forcefully pivot said butterfly valve member from said initial open position through said angular increment to said first closed position.

13. The invention of claim 12 wherein said closing means includes a respective cam or wedge member movably carried upon said butterfly valve member and engageable with said duct wall to forcefully move said valve member relative thereto.

14. The invention of claim 13 further including a respective closing actuator carried upon said butterfly valve member and selectively moving said respective cam or wedge member to effect said pivotal movement of said butterfly valve member.

15. The invention of claim 8 wherein said engagement means moves said butterfly valve member in both directions through said angular increment between said first closed position and said initial open position.

16. A butterfly valve comprising:
  a duct member having an elongate circumferential wall bounding an axially extending fluid flow path therein;
  a plate-like butterfly valve member disposed in said flow path and freely pivotally movable about a transverse pivot axis between a first position wherein said valve member is transverse to said duct axis and sealingly cooperates with said wall to close said fluid flow path, said valve member pivoting about said pivot axis to a second position wherein said valve member is generally parallel with said duct axis to allow fluid flow in said flow path:
  said butterfly valve member including a pair of wing portions of substantially equal area disposed on opposite sides of said pivot axis, one of said pair of wing portions being a downstream wing with respect to pivotal movement of said valve member from said first to said second position and fluid flow in said flow path:
  and means carried upon said plate-like butterfly valve member for selectively enlarging the effective area of said downstream wing.

17. The invention of claim 16 wherein said means for enlarging said downstream wing includes a planar flap member carried by said butterfly valve member at said downstream wing thereof, and means for disposing a part of said flap member generally in the plane of said valve member and outside the perimeter thereof to enlarge the silhouette of said valve member at said downstream wing thereof.

18. The invention of claim 17 wherein said planar flap member includes an outer edge, said butterfly valve member including a respective perimeter edge, in a first position of said flap member said outer edge being disposed inwardly of said perimeter edge, and said flap member translating generally in the plane thereof to a second position wherein said outer edge of said flap member is disposed outwardly of said perimeter edge at said downstream wing, thereby to enlarge the silhouette of said butterfly valve member at said downstream wing.

19. The invention of claim 18 further including an actuator carried upon said butterfly valve member and moving said flap member between said first and said second positions.

20. The invention of claim 19 further including engagement means for forcefully pivotally moving said butterfly valve member from said first closed position thereof through an angular increment toward said second position thereof to an initial open position.

21. The invention of claim 20 wherein said actuator drives said engagement means to effect pivotal movement of said butterfly valve member through said angular increment.

22. The invention of claim 21 wherein said actuator drives said engagement means to effect said pivotal movement of said valve member while said flap member remains in said first position thereof.

23. The invention of claim 20 wherein said engagement means includes a cam or wedge member carried by said valve member and engaging said duct wall, said cam or wedge member translating generally in the plane of said butterfly valve member, and while said valve member occupies said first closed position and cam or wedge member providing a generally axially directed force to said valve member spaced from said pivot axis to forcefully move said valve member through said angular increment by reaction with said duct wall.

24. The invention of claim 23 wherein said duct wall defines a radially extending recess opening to said flow path and receiving said cam or wedge member.

25. The invention of claim 24 wherein said recess is disposed entirely downstream of a line of sealing engagement of said valve member with said duct wall in said first position of said valve member.

26. The invention of claim 24 wherein said duct wall carries a roller member within said recess, said cam or wedge member engaging said roller member to engage said duct wall.

27. The invention of claim 21 further including effecting means for forcefully pivotally moving said butterfly valve member from said initial open position through said angular increment to said first closed position thereof.

28. The invention of claim 27 wherein said actuator drives said effecting means.

29. The invention of claim 28 wherein said effecting means includes a cam or wedge element carried upon said valve member and engaging said duct wall.

30. The invention of claim 29 wherein said duct wall defines a radially extending recess opening to said flow path and receiving said cam or wedge element therein.

31. The invention of claim 30 wherein said recess is disposed entirely downstream of a line of sealing engagement of said valve member with said duct wall in said first closed position of said valve member.

32. A method of controlling fluid flow in a duct, and duct having a wall bounding a flow path wherein flows said fluid; said method including the steps of:
  disposing a plate-like valve member in said flow path, which valve member is pivotally movable about an axis generally transverse to said duct between a first position transverse to and closing said flow path and a second position generally parallel with said flow path to open and allow fluid flow therein:
  transecting said valve member with said pivot axis to define with respect to direction of said fluid flow in said duct and pivotal movement of said valve member toward said open position an upstream valve member wing and a downstream valve member wing each substantially equal in area:
  increasing the effective area of said valve member upon which said fluid flow exerts fluid dynamic flow forces; and
  pivoting said valve member toward said second open position thereof in response to said increase of effective area.

33. The method of claim 32 wherein said step of increasing effective area of said valve member includes the step of increasing the effective area of said downstream wing.

34. The method of claim 33 wherein said step of increasing the effective area of said downstream wing includes the steps of disposing a flap member movably upon said valve member, and extending said flap member outwardly of a perimeter of said valve member at said downstream wing.

* * * * *